United States Patent
Bryman (10) Patent No.: US 7,321,122 B2
(45) Date of Patent: Jan. 22, 2008

(54) SYSTEM FOR SELECTING TRUE COINCIDENCE EVENTS IN POSITRON EMISSION TOMOGRAPHY

(75) Inventor: Douglas Bryman, Vancouver (CA)

(73) Assignee: Triumf, B.C. (CA)

( * ) Notice: Subject to any disclaimer, the term of this patent is extended or adjusted under 35 U.S.C. 154(b) by 76 days.

(21) Appl. No.: 11/290,448

(22) Filed: Dec. 1, 2005

(65) Prior Publication Data
US 2006/0138332 A1  Jun. 29, 2006

Related U.S. Application Data (60) Provisional application No. 60/631,881, filed on Dec. 1, 2004.

(51) Int. Cl.
*G01T 1/164* (2006.01)
*G01T 1/166* (2006.01)

(52) U.S. Cl. ............... 250/363.03; 250/363.04

(58) Field of Classification Search ........ 250/363.03, 250/363.04, 361 R, 366, 367, 385.1
See application file for complete search history.

(56) References Cited

U.S. PATENT DOCUMENTS

| | | | | |
|---|---|---|---|---|
| 5,567,944 A | * | 10/1996 | Rohe et al. | 250/370.09 |
| 5,665,971 A | * | 9/1997 | Chen et al. | 250/385.1 |
| 6,484,051 B1 | * | 11/2002 | Daniel | 600/436 |
| 7,253,415 B2 | * | 8/2007 | Bryman | 250/363.03 |
| 2002/0008205 A1 | | 1/2002 | Kurless et al. | |
| 2002/0011571 A1 | * | 1/2002 | Lin et al. | 250/366 |
| 2006/0086904 A1 | * | 4/2006 | Worstell | 250/363.04 |

FOREIGN PATENT DOCUMENTS

WO  WO 2004/008177  1/2004

* cited by examiner

*Primary Examiner*—David Porta
*Assistant Examiner*—Faye Boosalis
(74) *Attorney, Agent, or Firm*—Harness, Dickey & Pierce, P.L.C.

(57) ABSTRACT

Provided are new methods for enhancing the selection of true (T) annihilation events relative to the inclusion of true scattered (TS) and random (R) annihilation events in PET tomographs and thereby improving the sensitivity and/or resolution of PET scanners. The methods include reconstruction of Compton scattering interactions in the γ-ray detectors for determining the angles of incidence of the γ-rays received at the detectors and may utilize γ-ray polarization effects and electron recoil data associated with positron annihilation and Compton scattering. The use of the γ-ray polarization effects provides an improved ability for selecting data corresponding to T events while simultaneously suppressing data corresponding to TS and R events during PET applications.

5 Claims, 4 Drawing Sheets

SYSTEM FOR SELECTING TRUE COINCIDENCE EVENTS IN POSITRON EMISSION TOMOGRAPHY

PRIORITY STATEMENT

This application claims priority under 35 U.S.C. § 119 from U.S. Provisional Application No. 60/631,881, filed Dec. 1, 2004, the disclosure of which is incorporated herein by reference in its entirety as if set forth fully herein.

BACKGROUND OF THE INVENTION

Positron Emission Tomography ("PET") is an imaging technique that can be used to develop two-dimensional and three-dimensional tomographic images of a distribution of positron-emitting isotopes within a subject, such as a human patient undergoing medical imaging in which the resulting PET images provide a visual depiction of tissue differences within the subject. PET procedures typically involve introducing one or more radiolabeled pharmaceutical tracer compounds into the subject, usually through injection or inhalation. As the radioisotope(s) incorporated in the pharmaceutical tracer compound decays, it releases positrons. These positrons collide with surrounding matter before combining with an electron in an annihilation event that destroys the positron and electron while producing a pair of γ-ray photons that travel away from the annihilation event in opposite directions. If a pair of opposing γ-ray detectors both detect Tray photons within a predetermined period of time, a "coincidence event" is recorded based on the assumption that it was a single annihilation event that occurred along an axis extending between the opposed detectors that produced the detected γ-ray photons.

Conventional PET scanners include arrays of γ-ray detectors that can be provided in a number of configurations including, for example, one or more aligned rings or as one or more pairs of opposed detector plates with lines of response ("LOR") being defined between opposing pairs of detectors. During operation, the PET scanner collects the radioactivity distribution information within the subject by detecting and accumulating a series of annihilation events originating along each LOR. Regardless of the configuration of the particular PET scanner, the subject will typically be placed at or near the center of the detector array(s) or the near the axis about which detector plates rotate to allow for better sampling rates and provide improved resolution and image quality. Once the position data for a sufficiently large number of annihilation events has been collected, the data may be processed to provide a series of two-dimensional or a three-dimensional image corresponding to the distribution of radiolabeled pharmaceuticals within the subject.

With these conventional designs, the image spatial resolution of a PET system depends on a number of factors including, for example, the intrinsic detector spatial resolution, the acolinearity of the γ-ray photons, and the positron range of the radioisotopes incorporated in the pharmaceutical tracer compounds. Because the acolinearity (or noncolinearity) of the γ-ray photons and the positron range depend on the radioisotope(s) utilized, PET scanner design has tended to focus on improving scanner spatial resolution.

In most conventional PET scanners, a plurality of discrete scintillation crystals coupled to photodetectors have been used to increase the spatial resolution. Improvements in the design of the scintillation crystals and/or photodetectors can improve the spatial resolution, but are limited by an intrinsic spatial resolution that can not be less than one half of the width of the discrete scintillation crystals utilized in the detector. In conventional PET scanners incorporating ring detector geometry, the detector pairs define sampling lines having an average sampling distance that is generally about half of the crystal width. This is in accord with the Nyquist sampling theorem which holds that the smallest object that an imaging system can resolve is twice the size of the sampling distance. In order to achieve image spatial resolution approaching this theoretical limit, various modifications have been incorporated into conventional PET scanners to reduce the sampling distance(s) including, for example, designs in which the detector or the object are moved by a fraction of the detector width and designs that stack discrete crystals in a series of offset layers.

Several additional methods have been developed to improve the resolution of structures within the subject that are below the intrinsic spatial resolution of the detector. One such method includes using a γ-camera coupled to a "pinhole" collimator to produce an effectively enlarged image of the subject and thereby allowing effective resolution of objects smaller than the detector intrinsic spatial resolution. A significant limitation of such designs is the substantial reduction in the number of photons that traverse the "pinhole," thereby reducing detector efficiency.

Another imaging device is referred to as a "Compton camera" typically includes at least two detectors provided in a cooperative arrangement on a single side of the photon source (subject). The arrangement of the associated detectors provides for the sequential detection of a photon that interacts with at least two of the detectors. The interaction of the photon within the first detector is the result of the Compton effect while the interaction of the photon with the second detector is the result of the photoelectric effect. This sequential detection of a photon by two detectors enables a Compton camera to determine the photon's path without using mechanical collimators such as those conventionally utilized in γ-cameras. In this way Compton cameras tend to exhibit better resolution or discrimination against background than that achieved with conventional γ-cameras, but tend to achieve this at the expense of sensitivity (or fraction of gamma rays detected).

Despite its limitations, PET imaging is an increasingly important medical imaging tool, particularly as the sensitivity and/or resolution are improved and scanners are better able to provide more precise information regarding the nature of the tissues and structures within a scanned subject. Apparatus employed are then used to construct lines of response (LOR) from which images are developed using well known algorithms. In addition to the resolution degrading factors noted above, for example, the range of positrons within the subject and the intrinsic lack of colinearity exhibited by the annihilation γ-rays, PET imaging can compromised by detector spatial and energy resolutions, scattering of γ-rays within the subject before the γ-rays reach the detectors, and scattering in the detectors. In addition, random or accidental coincidences (i.e., not "true" coincidences) will be detected two or more γ-rays from separate annihilation events are detected within an opposed pair of detectors within the predetermined resolving time window. Detection and accumulation of these "false" coincidences limit the statistical precision of image reconstruction.

Events recorded in a typical PET tomograph include 1) the desired true unscattered coincidence events (T), 2) those coincidence events in which one or both of the γ-rays from a single annihilation event are scattered within the subject before entering the detector (TS), and 3) truly random coincidences (R). Adopting this terminology, the T events reflect the desired image information corresponding to the distribution of radioisotopes within the subject while those scattered TS and random R events that are detected as "coincidences" simply contribute "noise" that tends to degrade the resulting image. Although a number of elaborate techniques and algorithms have been developed in an effort to mitigate the effects of the noise on PET images, TS and R noise issues remain and continue to limit the resolution and precision of the resulting PET images.

BRIEF SUMMARY OF THE INVENTION

Provided here are new methods for enhancing the selection of true (T) annihilation events relative to the inclusion of true scattered (TS) and random (R) annihilation events in PET tomographs for improving the sensitivity and/or resolution of a PET scanner. The method include reconstruction of Compton scattering interactions in the γ-ray detectors for determining the angles of incidence of the γ-rays received at the detectors and utilizes γ-ray polarization effects associated with positron annihilation and Compton scattering. The use of the γ-ray polarization effects provides an improved ability for selecting data corresponding to T events while simultaneously suppressing data corresponding to TS and R events during PET applications.

BRIEF DESCRIPTION OF THE DRAWINGS

The scope of the invention will become more apparent to those of ordinary skill in the art by referring to the detailed description of example embodiments provided below with reference to the attached drawings in which.

These drawings have been provided to assist in the understanding of certain example embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity.

Those of ordinary skill in the art will also appreciate that a range of alternative configurations have been omitted simply to improve the clarity and reduce the number of drawings. Those of ordinary skill will also appreciate that certain of the various process steps illustrated or described with respect to the example embodiments may be selectively and independently combined to create other methods useful for manufacturing semiconductor devices without departing from the scope and spirit of this disclosure.

DETAILED DESCRIPTION OF EXAMPLE EMBODIMENTS

Example embodiments of the invention will now be described more fully hereinafter with reference to the accompanying drawings, in which example embodiments of methods according to the invention are shown. Those of ordinary skill in the art will, however, appreciate that this invention may be embodied in many different forms and should not be construed as being limited to the example embodiments illustrated and described herein. Rather, these example embodiments are provided so that this disclosure will be thorough and complete, and will fully convey the scope of the invention to those skilled in the art. Identical or related reference numerals and designations are used throughout the specification and drawings to identify identical and/or corresponding elements of the illustrated structures.

Compton Cameras

Figure 4:
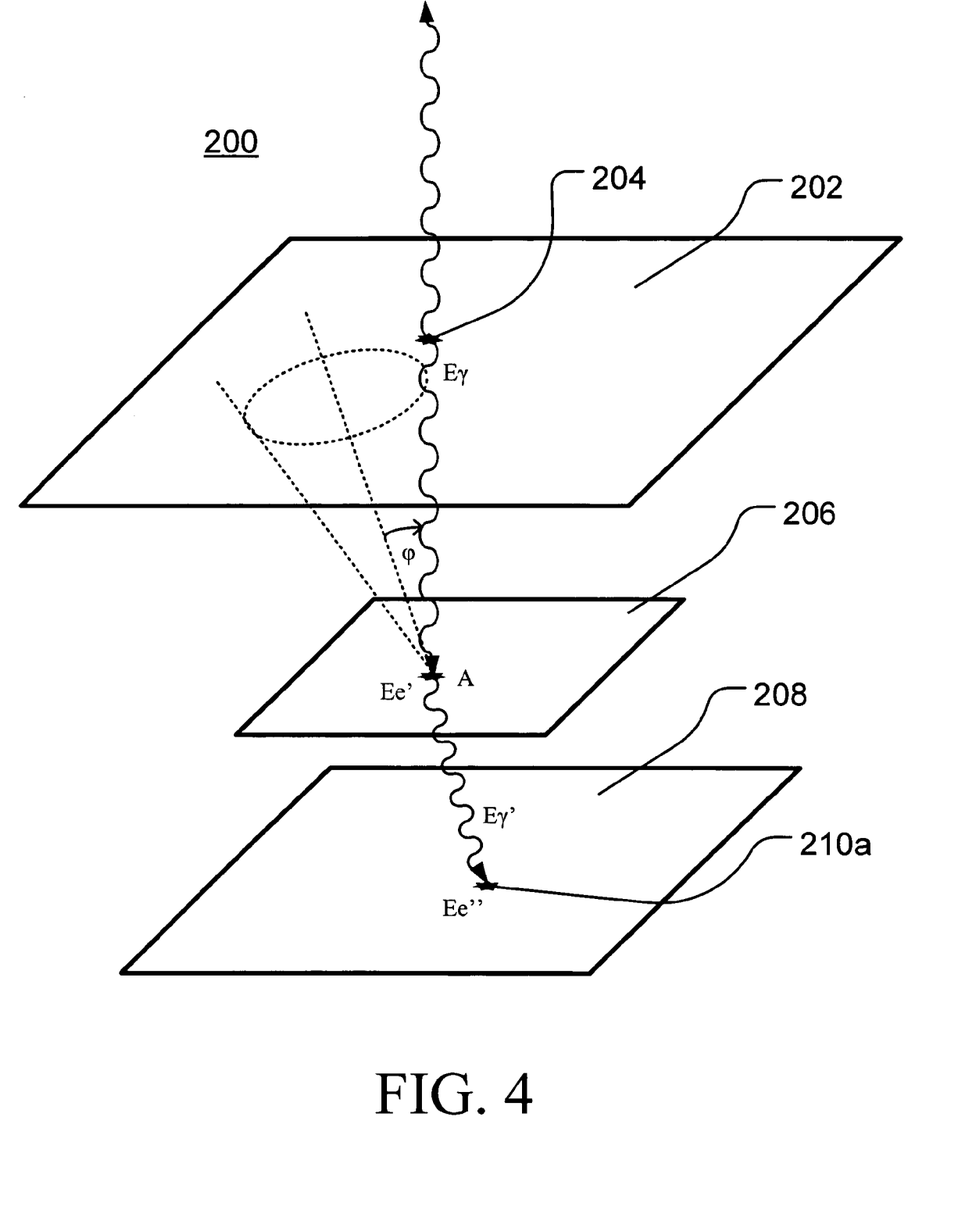
FIG. 4 illustrates the general operation of a Compton camera.

Conventional Compton cameras 200, as generally illustrated in FIG. 4, include first 206 and second 208 detectors arranged on the same side of an imaging area 202 in which the subject (and photon source) will be placed for scanning. The first and second detectors are arranged in a specific configuration with the material and structure of the first detector designed to induce Compton scattering A of transiting photons (i.e., cause a scattering event) within the first detector or a scattering member associated with the first detector, that the trajectories and energy $E\gamma'$ of the photons exiting the first detector are modified relative to the trajectories and energy $E\gamma$ of the same photons entering the first detector. The first detectors are typically configured to detect the position of the scattering event, the energy absorbed during the scattering event and the time of the scattering event. Accordingly, the first detectors are typically relatively thin so that the number of photons that are absorbed within (and do not exit) the first detector is relatively small. Reducing the thickness of the first detectors also tends to reduce the likelihood of secondary and tertiary scattering events and to reduce the impact of scattering events occurring at different depths within the first detector.

Conventional second detectors are, in turn, configured and positioned to increase the likelihood that photons scattered within the first detector will tend to enter the second detector 210a. Because the angle at which the scattered photons exit the first detector may vary widely, many second detectors are configured as hemispheres, open boxes, or other regular shapes that can be combined with the first detector to define a space enclosing the common range of scattering angles and increase the likelihood that the scattered photons will be detected.

An absorption member within the second detector absorbs the scattered photons (i.e., absorption events), identifies the positions of the absorption events, the energies absorbed during the absorption events and the times at which the absorption events occurred. The energies and locations of coincident scattering and absorption events are combined with a knowledge of the expected energy of photons generated by the radionuclide photon source in order to define, within a conical ambiguity φ, the range of paths that could have been taken by the detected photons before their collisions with the first detector.

After conical possibility data corresponding to a large number of detected photons has been generated and collected for analysis, various tomographic techniques may be employed to locate the origin of groups of detected photons and calculate the corresponding lines of response (LOR) by finding the intersections of many different possible path cones corresponding to the detected photons. As described above and discussed widely in the relevant literature, the source origin data can then be combined and processed to generate a two-dimensional or three-dimensional image of the scanned subject.

One technique for improving the accuracy of radionuclide imaging involves reducing the distance between a photon source and a detector. For instance, in the case of a Compton camera moving the first detector closer to the scanned subject will reduce the spatial uncertainty corresponding to a given angular uncertainty and allow for more accurate and/or faster calculation of the source location. Moreover, moving the first detector closer to the scanned subject also increases the solid angle subtended by the first detector from the photon source. Reducing the angular uncertainty, in turn, increases camera sensitivity. Accordingly, in many instances Compton cameras are mounted on articulating arms that allow the detectors to be repositioned relative to the scanned subject over the course of a scan.

Further, an additional risk occurs when one or both of the γ-ray photons emitted by an annihilation event is absorbed or scattered (deflected) by the particular composition(s) and configuration of the materials and/or tissues present in the scanned subject. As a result, radiopharmaceutical tracer compounds may be absorbed by other tissues or organs other than the organ or organ system of particular interest and increase the difficulty of differentiating between photons emanating from the organ of interest and photons emanating from surrounding tissue or organs.

Attempts to address these concerns have including suppressing the impact of photons produced in materials, tissues and/or organs that are not of any particular interest by blocking photons from the surrounding tissue and organs using radio-opaque shielding (e.g., a lead shield) or a collimator. Unfortunately, in those instances in which there is some distance between the organ of interest and the first detector, a blocking shield will generally be relatively ineffective as photons from the tissue and organs adjacent the organ of interest can impact the first detector at certain angles. In addition, when those portions of the scanned subject are the organ of interest is not, or cannot be positioned, proximate the first detector, an effective collimator which could block angled photons from the tissue and the organ of interest would typically require very small apertures. The use of such a collimator would substantially reduce the sensitivity of a Compton camera because only those photons that are substantially parallel to the longitudinal axis of the small apertures, thereby minimizing one of the advantages typically associated with Compton systems.

Scattered Events and Random Coincidences

Figure 1A:
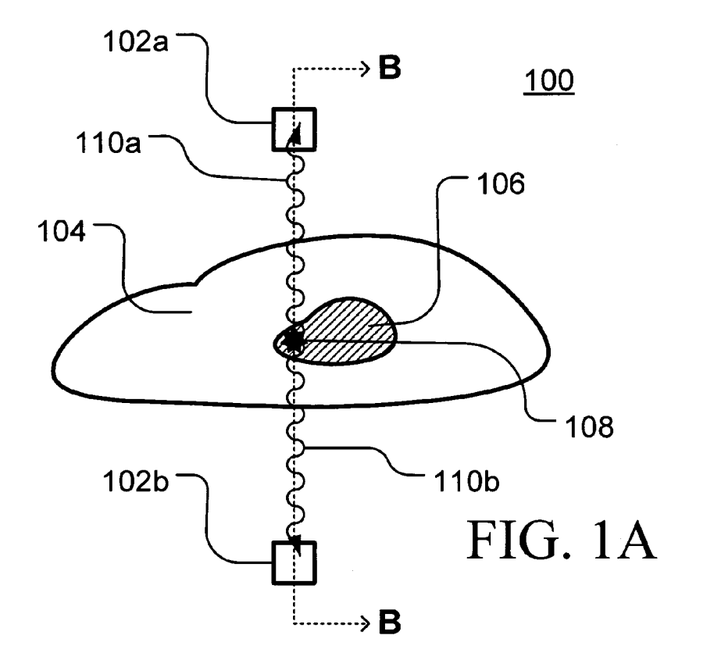
FIGS. 1A and 1B illustrate the detection of an actual or true (T) annihilation event by an opposed pair of detectors corresponding to a single annihilation event.
Figure 1B:
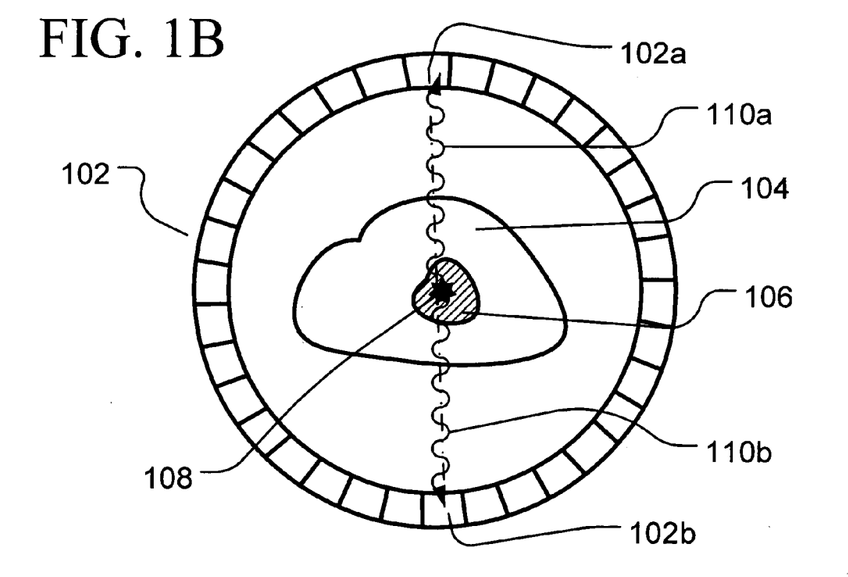

FIGS. 1A and 1B illustrate a side and end view of a conventional PET spectrometer 100 consisting of a ring of γ-ray or photon detectors 102 such as position-sensitive scintillating crystal detectors coupled with corresponding photo-sensitive devices. The ring of detectors 102 surrounds a subject 104, such as a patient, that will typically include a region 106 of higher density and/or higher accumulation of the target radioisotope. As illustrated in FIGS. 1A and 1B, a true coincidence event (T) in which both γ-rays from a positron annihilation event 108 are detected in an opposed pair 102a, 102b of the tomograph's detectors. Accordingly, in a true event, the data associated with the detected γ-rays can be used to determine the actual LOR 112 associated with the annihilation event.

Figure 2A:
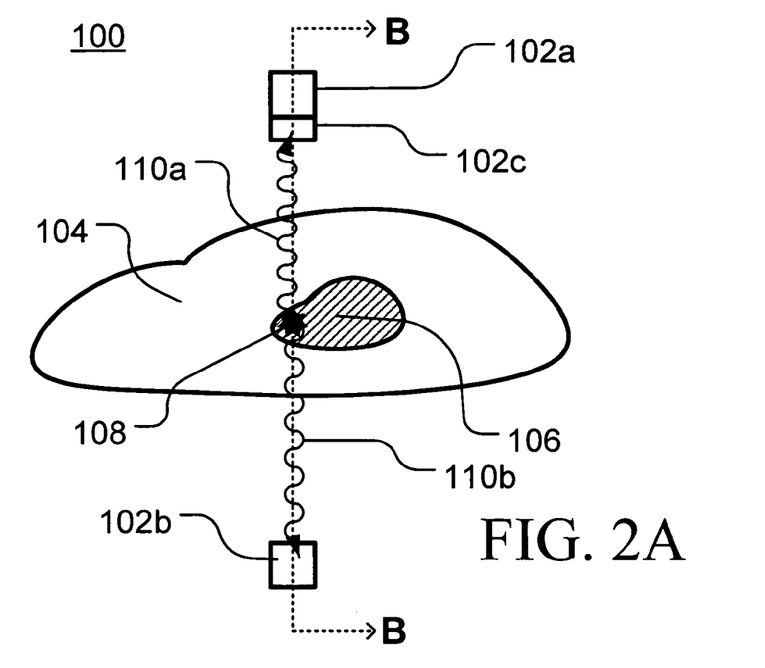
FIGS. 2A and 2B illustrate the detection of a shifted or scattered true (TS) annihilation event by an opposed pair of detectors corresponding to a single annihilation event in which one or both (not shown) of the photons is scattered before reaching a detector.
Figure 2B:
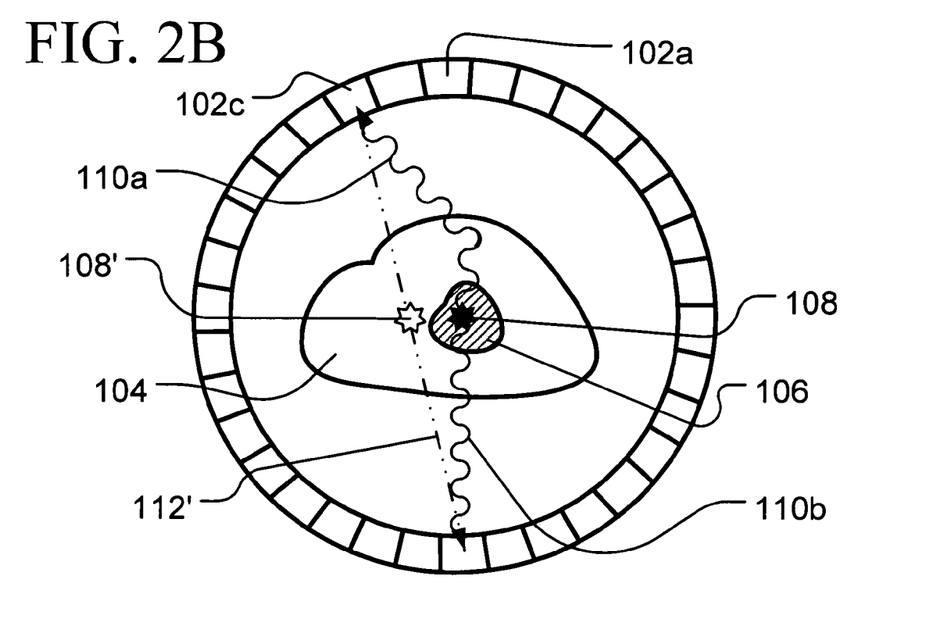

FIGS. 2A and 2B illustrate a side and end view of a conventional PET spectrometer 100 consisting of a ring of γ-ray or photon detectors 102 such as position-sensitive scintillating crystal detectors coupled with corresponding photo-sensitive devices. The ring of detectors 102 surrounds a subject 104, such as a patient, that will typically include a region 106 of higher density and/or higher accumulation of the target radioisotope. As illustrated in FIGS. 2A and 2B, however, a scattered coincidence event (TS) occurs when one or both (not shown) of the γ-rays from a positron annihilation event 108 are detected in a different opposed pair 102c, 102b of the tomograph's detectors. Accordingly, in a scattered coincidence event TS, the data associated with the detected γ-rays will correspond to a shift LOR 112' and, if not excluded, will be attributed to a shifted or false annihilation event position 108', thereby degrading the quality of the accumulated data and reducing the effective resolution of the PET scanner.

Figure 3A:
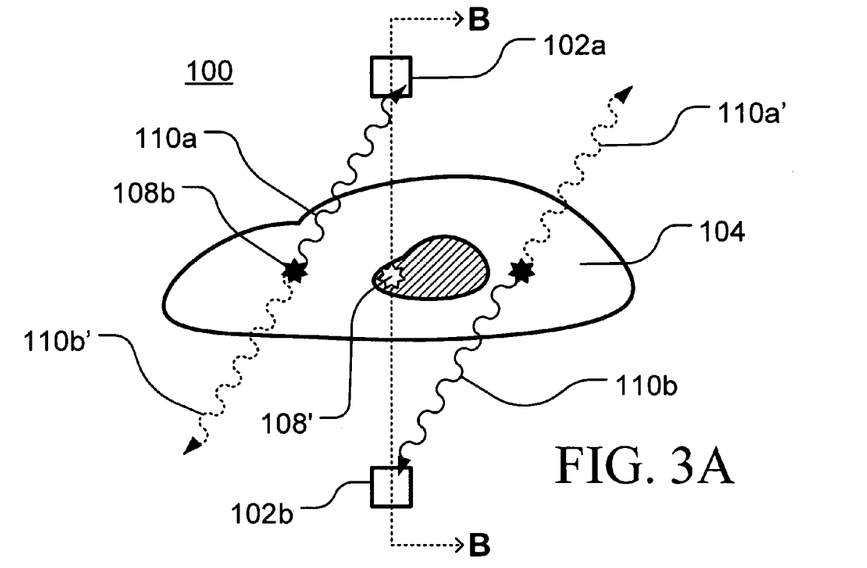
FIGS. 3A and 3B illustrate the detection of a false or random R annihilation event by an opposed pair of detectors corresponding to a pair of annihilation events in which only a photon from each of the annihilation events reaches one of an opposed pair of detectors within the acceptance time window.
Figure 3B:
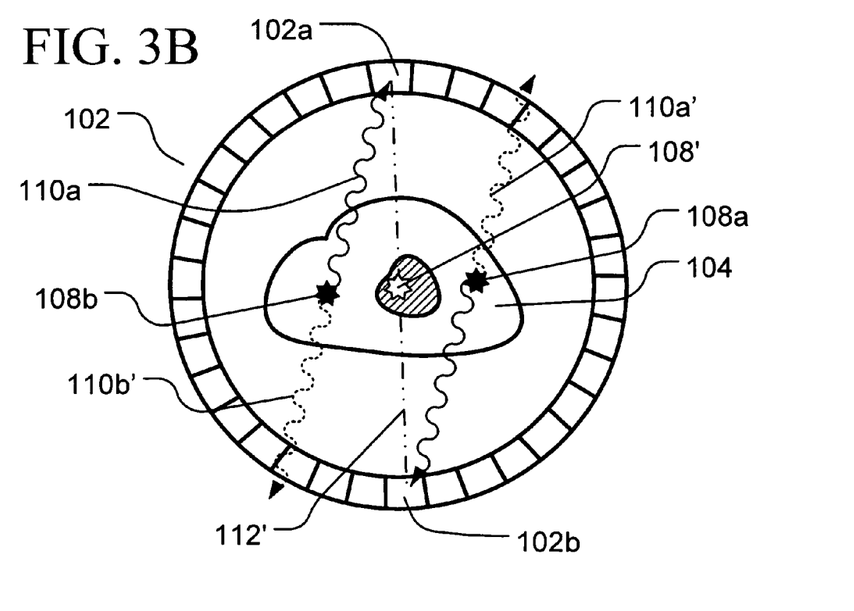

FIGS. 3A and 3B illustrate a side and end view of a conventional PET spectrometer 100 consisting of a ring of γ-ray or photon detectors 102 such as position-sensitive scintillating crystal detectors coupled with corresponding photo-sensitive devices. The ring of detectors 102 surrounds a subject 104, such as a patient, that will typically include a region 106 of higher density and/or higher accumulation of the target radioisotope. As illustrated in FIGS. 3A and 3B, however, a random coincidence event (R) occurs when a γ-rays 110a, 110b from each of two different positron annihilation events 108a, 108b are detected in an opposed pair 102a, 102b of the tomograph's detectors. The remaining γ-rays 110a', 110b' are, in turn, emitted at an angle or at a position on the ring 102 that prevents their detection. Accordingly, in a random coincidence event, the data associated with the detected γ-rays will correspond to a false LOR 112' and, if not excluded, will be attributed to a shifted or false annihilation event position 108', thereby degrading the quality of the accumulated data and reducing the effective resolution of the PET scanner.

As will be appreciated by those skilled in the art, a number of factors will tend to prevent a portion of the γ-rays associated with the true coincidence events from being properly detected. These factors include, for example, the detector design, scattering of γ-rays before reaching a detector, reaching the detector with insufficient energy to be counted and/or depositing only a portion of their energy as they pass through the detector.

In typical PET tomographs, signals from selected sets of detector element pairs are accepted if they occur within a specified coincidence time window τ. Each detector element is potentially paired with a subset (or fan) of other detector elements. The detector elements are typically arranged in a ring or rings surrounding the scanned subject, typically a human patient. A coincidence of signals from the $i^{th}$ and $j^{th}$ detector in the ring (or between rings), $P_i \cdot P_j$, within the allowed time window τ will be considered to be the result of a true annihilation event T corresponding to a single LOR. The detected photon data is often also qualified by using energy information (e.g., an energy threshold) for the signals from detectors i and j in order to suppress counting of those γ-rays which have scattered and lost a significant portion of their initial energy during their journey to the detector.

A "T" event occurs when a single positron annihilation produces two γ-rays that are detected nearly simultaneously and in which neither γ-ray scattered in the patient or object before detection. T events interact in the detectors within a finite time interval due to the speed of light from the point of annihilation and due to the properties of the detector response. Events in which one or both γ-rays scattered (losing energy in the process) before interacting in the detectors ("TS") also usually occur within the acceptance time window. TS events are often suppressed by requiring an energy threshold on each detected γ-ray for accepted events. Various algorithms and simulations are also used routinely to reduce the impact of scattered events.

Random coincidences also degrade the performance of the tomographs by introducing background noise to the image reconstruction algorithms resulting in images of reduced quality. The primary source of the random events is two or more annihilation events occurring within the coincidence time window and energy acceptance of the apparatus, and in which two γ-rays (one from each of the unrelated events) are detected by a valid pair of detector elements. The fraction of random events is routinely determined by sampling out-of-time events and correcting the data accordingly or by using simulations. Although various analysis algorithms have been developed to minimize the effects of the random events and the effects of the scattered events, the presence of these events and the corrective measures required tend to degrade the resolution and quality of image reconstruction.

Reconstruction of Compton Scattering—Compton Cameras

For γ-rays having an energy of about E=511 keV, the dominant interactions between the γ-rays and most materials through which the γ-rays pass are Compton scattering and photo-absorption. The fraction of low energy γ-rays incident on a detector which undergo Compton scattering in the detector is characterized by $f_c=1-f_p$ where $f_p$ is the fraction of events undergoing photo-absorption and $f_p+f_c \cong 1$. The relative values of $f_p$ and $f_c$ depend on the material(s) composing the detector. TABLE 1 shows the fraction of various types of events in a fully efficient detector used to detect coincident PET γ-rays assuming both γ-rays eventually deposit their full energies in the detectors. Here, "Compton interaction" refers to one or more Compton scatters of a γ-ray followed by photo-absorption in which the full energy of the incident γ-ray is collected.

TABLE 1

Event types in a PET Compton Camera.

| Event Type | Relative Fraction |
|---|---|
| 1. Both photo-absorptions | $f_p f_p$ |
| 2. One photo-absorption, one Compton | $2 f_p f_c$ |
| 3. Both Compton interactions | $f_c f_c$ |

In Compton scattering, the incident γ-ray interacts with an atomic electron depositing energy and a secondary ("scattered") γ-ray is emitted at an angle $\theta_c$ relative to the incident direction according to equation I $$\cos\theta_C = 1 - \frac{E_1 mc^2}{E(E-E_1)} \quad (I)$$

where m is the mass of the electron, c is the speed of light, $E_1$ is the energy deposited in the first interaction and E is the energy of the incident γ-ray. The secondary γ-ray interacts either by photo-absorption or by subsequent Compton scattering. If the energy and position of the first interaction is determined along with the energy of the secondary γ-ray and the position of interaction of the secondary γ-ray, then the original direction of the incident γ-ray can be determined to lie on the surface of a cone (or on an "event circle" on the sky as used in astronomy). This technique is well known and has previously been employed in Compton cameras used in medical imaging, see, e.g., R. W. Todd, et al., *Nature*, 251, (1974) pp. 132-34, and T. Tomitani and M. Hirasawa, *IEEE Trans. Nucl. Sci.* 50, (2003) 1602 and the references cited therein, and γ-ray astronomy, see, e.g., E. Aprile et al., *Proc. SPIE* 4851(2002) 140; ArXiv:astro-ph/0212005, the disclosures of these references being incorporated herein in their entirety by reference.

Some researchers have discussed techniques of constraining the γ-ray direction to lie on an "arc" (or angular region) of the reconstructed cone (circle) by measuring the recoil direction of the electron emitted in the initial Compton scattering. See, for example, T. Schopper, et al., *IEEE Nuc. Sci. Symp. Conf. Proc.*, Lyon, France, Vol. 3., 122 (2000); and T. J. O'Neill, et al., *AIP Conf. Proc.* 510 (2000) 804, the disclosures of these references being incorporated herein in their entirety by reference. This technique is mainly applicable to higher energy γ-rays but would useful in the context described below.

Compton cameras are generally used to determine images for sources of single unpolarized γ-rays. A. Braem, et al. *Nucl. Instr. Meth. A* 525 (2004) 268 and European Patent Application PCT/EP 02/07967, have proposed a Compton enhanced PET scanner which would use Compton events to enhance the coincidence efficiency of a PET scanner based on crystal scintillator detectors, the disclosures of these references being incorporated herein in their entirety by reference.

Compton Scattering and Polarization Effects

It has also been shown that the reconstruction of double Compton scattering events in Compton cameras, particularly with respect to their use in telescopes, can improve the imaging quality achieved using unpolarized γ-ray sources. In this technique, an unpolarized γ-ray is detected by two subsequent Compton interactions followed by full absorption. See S. E. Boggs, *Nucl. Instr. Meth. A* 503 (2003) 563, the disclosure of this reference being incorporated herein in its entirety by reference. The first scattered γ-ray will be partially polarized in a direction perpendicular to the scatter plane. The second scattered γ-ray will most likely be scattered in a plane perpendicular to the polarization direction, or equivalently, in the same plane of the initial scatter containing the source, and both the first and second interaction points. These effects were previously demonstrated using a Monte Carlo simulation as described by N. Dogan, et al., *IEEE Trans. Nucl. Sci. NS*-39 (1992) 1427; N. Dogan, Ph.D. thesis, University of Michigan (1993), and later by experimental observation as reported in A. Curioni and E. Aprile, arXiv:hep-ex/0306040 (2003), the disclosures of these references being incorporated herein in their entirety by reference.

Thus, for events in which there are two or more Compton scatters within the detector, a partial angular "arc" (or angular region) of the cone surface described above may be identified as most probably containing the source (or, equivalently, a line determined by the position of the source and the position of interaction). A partial arc could also be identified if the electron recoil direction were measured.

Polarization of Annihilation Radiation

The annihilation of a positron-electron pair is dominated by the case in which the pair has zero relative angular momentum resulting in two emitted γ-rays. If one γ-ray is linearly polarized in one plane, the other γ-ray is linearly polarized in the perpendicular plane according to the well established theory of quantum electrodynamics. The perpendicular relative polarization of the emitted γ-rays in positron annihilation is well known and has been confirmed experimentally. See H. Snyder et al., *Phys. Rev.* 73 440 (1948) the disclosure of this reference being incorporated herein in its entirety by reference.

For example, if γ-ray A of the annihilation pair has x-polarization, γ-ray B has y-polarization where the x and y directions are perpendicular to each other and to the direction of propagation. The Compton scattering cross sections for polarized γ-rays are significantly greater for scattering into the plane at right angles to the electric field (E) vector of the incident γ-ray (i.e., 90° to the direction of polarization). The so-called Klein-Nishina formula for the scattering cross section may be approximated using Equation II:

$$\sigma = \frac{E - E_1}{E} + \frac{E}{E - E_1} - 2\sin^2\theta_c \cos^2\varphi \quad (II)$$

where φ is the angle between the plane of scattering and the E vector of the incident γ-ray.

For positron annihilation γ-rays which have both undergone Compton scattering the following relation has been derived and disclosed in H. Snyder et al., *Phys. Rev.* 73 440 (1948), for the differential probability of scattering of the two γ-rays into solid angles $d\Omega_1$ and $d\Omega_2$ according to Equation III $$dP = \frac{E_1^2 E_2^2 (\gamma_1 \gamma_2 - \gamma_1 \sin^2\theta_2 - \gamma_2 \sin^2\theta_1 + 2\sin^2\theta_1 \sin^2\theta_2 \sin^2\phi)}{C} d\Omega_1 d\Omega_2 \quad (III)$$

where $$\gamma_1 = \frac{E_1}{E} + \frac{E}{E_1}, \gamma_2 = \frac{E_2}{E} + \frac{E}{E_2},$$

$$C = 4\pi E^4 \left(\frac{40}{9} - 3\ln 3\right)^2,$$

$E_1(\theta_1)$ and $E_2(\theta_2)$ are the energies (angles) of the scattered γ-rays, and φ is the angle between the two planes of scattering.

Given the observation of the direction of scattering of γ-ray A, the scattering direction of γ-ray B will occur with a known probability distribution characterized by $P(\theta_1, \theta_2, \phi)$. As an example, at $\theta_1 = \theta_2 = 90°$, the relative probability ("analyzing power") for γ-ray B scattering at φ=90° is 2.6 times greater than for scattering at φ=0°. H. Snyder et al., *Phys. Rev.* 73 440 (1948).

Selecting True Coincidences in PET

The present invention provides new methods for preferentially selecting T events and suppressing or reducing TS and R events accepted by PET tomographs by using a Compton camera array as a PET scanner. According to the methods of the invention, Compton scattering event reconstruction of one or both γ-rays observed to be in coincidence is used to identify those coincidence events that are more likely to be T events. Compton cameras suitable for use with these methods will typically be configured to surround, or be moved around, the patient or object which is the source of the annihilation radiation as in conventional PET scanners. Those skilled in the art will appreciate that other geometries, such as planar detectors, may also be utilized. Detectors using gas or liquid xenon or argon as, for example, disclosed in A. Curioni et al., arXiv:hep-ex/0306040 (2003), the disclosure of which is incorporated herein in its entirety by reference, position-sensitive solid state detectors such as CaZTe and Ge, and many others may also be suitable for certain applications.

A method according to an embodiment of the invention is applicable to event types 2 and 3 indicated in TABLE 1. For events of type 2 (in which one γ-ray undergoes Compton scattering and the other γ-ray interacts by photo-absorption) the following method is followed:

Select coincident events (those that fall within the device time coincidence window τ) in which the total energy observed for each detected γ-ray surpasses a given threshold (or occurs within the specified energy window);

Reconstruct the cone surface of possible incident angles for the first γ-ray (A) which undergoes one or more Compton scatterings in the camera followed by photo-absorption in the camera;

Project the reconstructed cone to the opposite side of the camera where the second γ-ray (B) has undergone a photo-absorption interaction. If there are two or more Compton scatters by γ-ray A, use only the limited cone arc surface derived from the polarization double-scattering information as determined in accord with the Boggs and Dogan references noted above;

In the event that the Compton camera is configured or may be configured to measure the recoil direction of the electron, then the double scattering will not be required for selecting a partial arc on the reconstructed cone;

Determine, within the angular resolution and position resolution of the device, the probability of overlap of the preferred cone surface region with the position of the photo-absorption interaction for γ-ray B;

Selectively retain the data associated with those events having a sufficiently high probability of overlap of the preferred cone surface region with the position of the photo-absorption interaction for γ-ray B, i.e., those with a high probability of being unscattered T events, for use in constructing the image.

Those of ordinary skill in the art will realize that variations of the above technique or procedures making use of reconstruction of the Compton scattering event(s) using information on one or both sides of the detector are also possible giving similar information which may be used to select the true angle or angles of the incident photons.

The best "cut" for selecting T events (and discriminating against TS and R events) would be determined using test data and simulations of the performance of the camera. (Alternatively, probability likelihood techniques or neural-net computing techniques, for example, may be used to select the most likely image location based on the ensemble of events, enhancing T events and suppressing TS and R events.) T events will have the highest probability of overlap of the projected cone (or cone region) with the position of the second γ-interaction. TS and R events will have significantly lower probabilities of overlap because their directions of incidence are either not well correlated (TS) or not correlated at all (R) with the second γ-ray's trajectory.

For events of type 3 in TABLE 1 (those events in which both γ-rays undergo Compton scattering in the detector)

another embodiment of the invention generates additional information for improving the selection of T events:

The procedure described above or an equivalent procedure may be applied twice. Initially, one of the detected γ-rays (A) would be treated as the Compton scatterer and the overlap of the cone (or cone portion) with the position of first interaction of the second γ-ray (B) would be evaluated as detailed above. The procedure would then be repeated with the assumptions regarding the γ-rays A and B interchanged. The combination of information from the two cases would be used to enhance the selection of T events.

Also for events of type 3 in TABLE 1 (those events in which both γ-rays undergo Compton scattering in the detector) another embodiment of the invention generates additional information for improving the selection of T events:

In addition to the above procedure, the polarization correlation of the pair of annihilation γ-rays described above could also be employed. Once the Compton scattering interactions for γ-rays A and B have been reconstructed, the probability $P(\theta_1, \theta_2, \phi)$ that the γ-rays were the result of a T event occurring at the observed values of $\theta_1$, $\theta_2$ and $\phi$, may be used to guide the improved and preferential selection of T events and allow for the suppression or rejection of the "false" TS and R events for which the correlation is not sufficient or is absent. The effectiveness of the suppression of TS events will, in turn, also depend on the angles of scattering within the detector.

Alternatively, it is possible to construct or calculate a probability likelihood distribution for determining an appropriate "cut-off" point for the detector data to provide a degree of improvement in the selection of T events while still maintaining adequate sensitivity. Similarly, test data using standard targets or derived from simulations of the performance of the particular Compton camera configuration may be used to guide the selection of the target values and thresholds. Further, probability likelihood techniques, neural-net computing and/or other data processing or analysis techniques may be used to select the most likely image location, enhancing T events while suppressing data associated with TS and R events.

Those of ordinary skill in the art will realize that variations of the above technique or procedure making use of reconstruction of the Compton scattering event(s) using information on one or both sides of the detector are also possible given information which may be used to select the true angle or angles of the incident photons.

Simulation

The design and operation of a range of γ-ray detectors and Compton cameras are well known to those skilled in the art and will not, therefore, be described in detail here. Compton cameras based on the use of liquid xenon and other materials as the detection medium with the capabilities of reconstructing Compton scattered events described above have been successfully demonstrated for detection of γ-rays in the relevant energy regime as reported by E. Aprile et al., *Proc. SPIE* 4851 (2002) 140; ArXiv:astro-ph/0212005. Similarly, it is expected that those skilled in the art will also be sufficiently conversant with the polarization effects described above that have been documented in the literature by both theory and experiment.

As an example, a simulation of the suppression of TS and R events relative to T events for γ-rays of E=511 keV using the Compton camera properties described in the Aprile reference noted above demonstrates the utility of the invention. For this case, for example, 92% of the TS and R events could be eliminated while accepting 21% of the T events. Those of ordinary skill in the art will, of course, appreciate that more or less suppression or acceptance may be utilized depending on the system and the performance requirements for different applications. The methods according to the invention thus provides techniques and systems for obtaining a very pure collection of data corresponding to T events that can be used in constructing an image having higher resolution. The invention is also compatible with conventional techniques for addressing scatter events and random events, allowing these techniques to be utilized for further enhancing the resulting image.

The invention may be utilized in the operation of medical or industrial imaging scanners such as PET tomographs which rely on coincident radiation measurements to reduce the degradation associated with accidental or random coincidences or by the scatter fraction due to events in which one or more of the γ-rays scattered before reaching the detectors. Further, the invention is applicable to all types of Compton cameras (liquid noble gas, gas, solid state, scintillation crystals, etc., or any combination of such detectors) that may be employed in a coincidence mode for PET or other imaging techniques.

Although the invention has been described in connection with certain example embodiments, it will be evident to those of ordinary skill in the art that many alternatives, modifications, and variations may be made to the disclosed methods in a manner consistent with the detailed description provided above. Also, it will be apparent to those of ordinary skill in the art that certain aspects of the various disclosed example embodiments could be used in combination with aspects of any of the other disclosed embodiments or their alternatives to produce additional, but not herein illustrated, embodiments incorporating the claimed invention but more closely adapted for an intended use or performance requirements. Accordingly, it is intended that all such alternatives, modifications and variations that fall within the spirit of the invention are encompassed within the scope of the appended claims.

I claim:

1. A method of collecting coincidence data relating to positron annihilation events in which two back-to-back photons are emitted comprising:

selecting coincident events detected within a Compton camera array in which a first γ-ray and a second γ-ray each surpass an energy threshold and in which the first γ-ray is Compton scattered and is detected in a first detector and the second γ-ray is Compton scattered or photo-absorbed and detected in a second detector, the first and second detectors being arranged in an opposed configuration;

reconstructing a cone surface corresponding to possible incident angles for at least one of the first or second γ-ray on at least one of the detectors;

projecting the reconstructed cone onto the opposed detector;

determining, within an angular resolution and a position resolution of the Compton camera array, a probability corresponding to an overlap of the reconstructed cone surface with a location of the first or second γ-ray detected in the opposed detector;

retaining data corresponding to coincidence events having a probability above an acceptance threshold; and using the retained data for constructing an image.

2. The method of collecting coincidence data according to claim 1, wherein both the first γ-ray and the second γ-ray undergo Compton scattering, further comprising:
 detecting energy deposited and angles of scattering reflecting behavior of the scattered first and the second γ-rays; and
 deriving a reconstructed partial cone arc surface using polarization information corresponding to the energy deposited and angles of scattering of the first and second γ-rays.

3. The method of collecting coincidence data according to claim 1, wherein the first γ-ray reflects at least two Compton scattering events, further comprising:
 determining recoil direction data corresponding to an electron scattered by the first γ-ray; and
 deriving a reconstructed partial cone arc surface using the recoil direction data.

4. The method of collecting coincidence data according to claim 1, wherein:
 the first γ-ray undergoes Compton scattering and the second γ-ray undergoes photo-absorption.

5. A method of collecting coincidence data comprising:
 selecting coincident events detected within a Compton camera array in which a first γ-ray and second γ-ray surpass an energy threshold and in which the first γ-ray is Compton scattered and detected in a first detector and the second γ-ray is Compton scattered and detected in a second detector;
 reconstructing a first cone surface corresponding to possible incident angles for the first γ-ray;
 projecting the first reconstructed cone onto the second detector;
 determining, within an angular resolution and a position resolution of the Compton camera array, a first probability corresponding to an overlap of the reconstructed cone surface with the second detector;
 reconstructing a second cone surface corresponding to possible incident angles for the second γ-ray;
 projecting the second reconstructed cone onto the first detector;
 determining, within an angular resolution and a position resolution of the Compton camera array, a second probability corresponding to an overlap of the reconstructed cone surface with the second detector;
 retaining data corresponding to coincidence events having both first and second probabilities above an acceptance threshold; and
 using the retained data for constructing an image.

* * * * *